United States Patent [19]
Thomas

[11] 3,982,118
[45] Sept. 21, 1976

[54] VEHICLE OUTSIDE LIGHT FIXTURE
[75] Inventor: Vaughn Thomas, East Orange, N.J.
[73] Assignee: The Raymond Lee Organization, Inc., New York, N.Y. ; a part interest
[22] Filed: Feb. 24, 1975
[21] Appl. No.: 552,120

[52] U.S. Cl. ............................ 240/7.1 R; 240/7.1 F; 240/8.1 R; 240/DIG. 7
[51] Int. Cl.² ............................................. B60Q 1/32
[58] Field of Search ......... 240/DIG. 7, 7.1 R, 7.1 E, 240/8.2, 8.22, 8.1 R, 8.1 A, 7.1 F

[56] References Cited
UNITED STATES PATENTS
1,998,157   4/1935   Fossum, Jr. ...................... 240/7.1 F
FOREIGN PATENTS OR APPLICATIONS
892,721   10/1953   Germany......................... 240/8.1 R
1,256,229   12/1971   United Kingdom ............. 240/7.1 F Primary Examiner—Stephen J. Tomsky
Attorney, Agent, or Firm—Daniel Jay Tick

[57] ABSTRACT

A housing has a front, rear, two sides, a translucent side part and an opaque side part mounted on a front fender of a motor vehicle generally aligned with the fender, with the opaque part facing the vehicle and the translucent part facing away from the vehicle. The translucent part of the housing is colored and has a front and opposite side part extending around the front of the housing and a front area of the opaque side of the housing. A colorless translucent window is formed in the translucent part of the center of the front of the housing. A headlamp in the housing in the area of the front center thereof projects light through the colorless window. A running lamp in the housing in the area of the rear center thereof illuminates the translucent part. A rear fender light fixture is also disclosed.

2 Claims, 7 Drawing Figures

FIG. 4

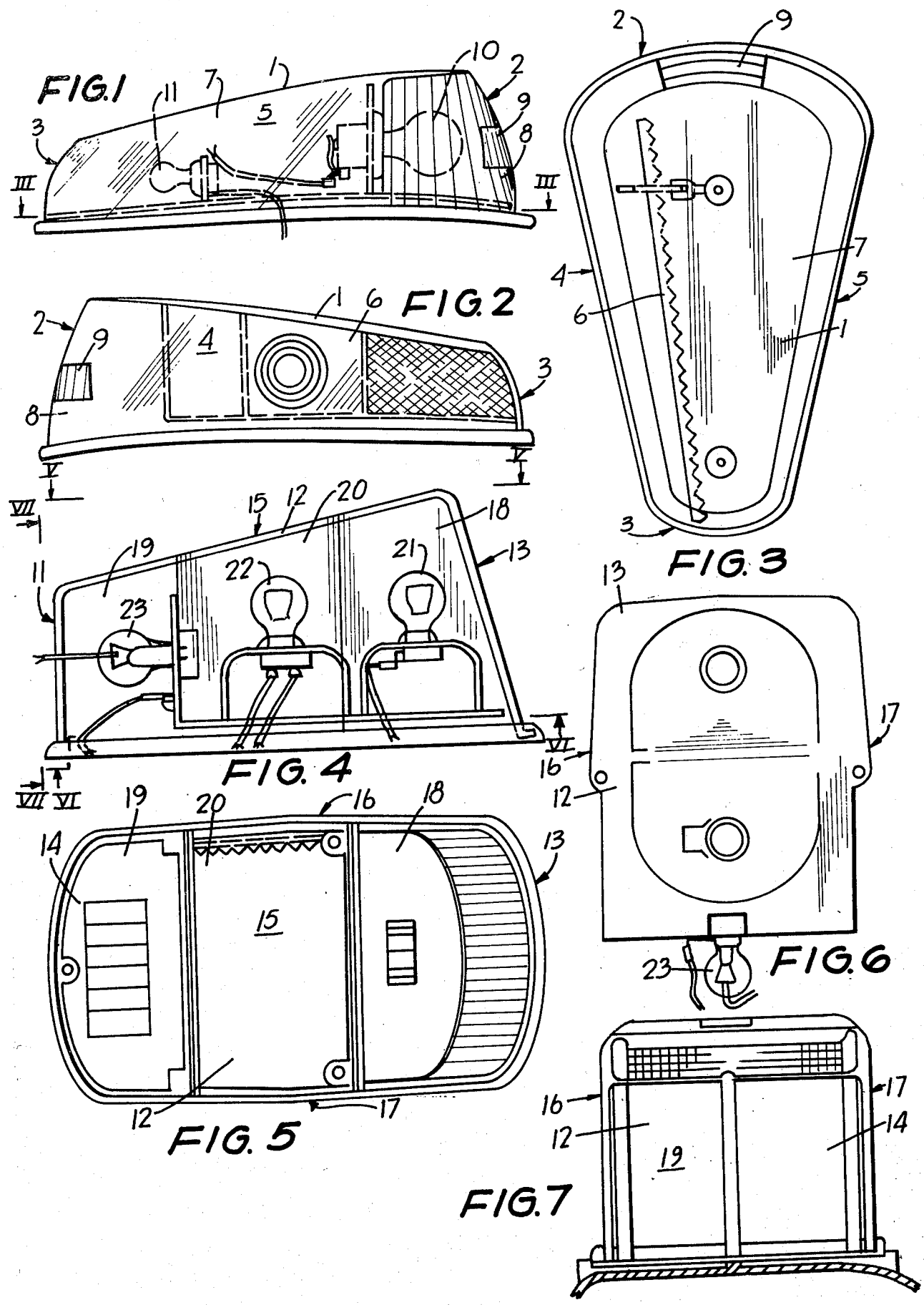

VEHICLE OUTSIDE LIGHT FIXTURE

DESCRIPTION OF THE INVENTION

The present invention relates to a vehicle outside light fixture.

Objects of the invention are to provide a vehicle outside light fixture of simple structure, which is inexpensive in manufacture, installable with facility and convenience on new and existing vehicles, especially of the type of the Volkswagen, and is attractive and pleasant in appearance as well as performing necessary functions.

In order that the invention may be readily carried into effect, it will now be described with reference to the accompanying drawing, wherein:

FIG. 1 is a side view from the engine, of an embodiment of an outside front fender light fixture of the invention;

FIG. 2 is a side view from the outside of the vehicle, of the embodiment of FIG. 1;

FIG. 3 is a view, taken along the lines III—III, of FIG. 1;

FIG. 4 is a side view of an embodiment of the outside rear fender light fixture of the invention;

FIG. 5 is a view, taken along the lines V—V, of FIG. 4;

FIG. 6 is a view, taken along the lines VI—VI, of FIG. 4; and

FIG. 7 is a view, taken along the lines VII—VII, of FIG. 4.

In the FIGS., the same components are identified by the same reference numerals.

The outside light fixture of the invention is for a motor vehicle having front fenders and rear fenders (not shown in the FIGS.).

In the embodiment of FIGS. 1, 2 and 3, the outside light fixture comprises a housing 1 having a front 2, a rear 3, two sides 4 and 5, a translucent side part 6 and an opaque side part 7 mounted on a front fender of a vehicle. The housing 1 is generally aligned with the fender, with the opaque part 7 facing the vehicle and the translucent part 6 facing away from the vehicle. The translucent part 6 of the housing 1 is colored yellow and has a front and opposite side part 8 extending around the front 2 of the housing and a front area of the opaque side 7 of the housing. A colorless or clear translucent window 9 is formed in the translucent part in the center of the front 2 of the housing 1.

A headlamp 10 is provided in the housing in the area of the front center thereof for projecting light through the colorless window 9.

A running lamp 11 is provided in the housing 1 in the area of the rear center thereof for illuminating the translucent part 6.

In the embodiment of FIGS. 4, 5, 6 and 7, the outside light fixture comprises a housing 12 having a front 13, a rear 14, a top 15 and two sides 16 and 17. The housing 12 has a front translucent part 18 colored yellow and extending around the front 13 and front areas of the sides 16 and 17 and top 15 of said housing. The housing 12 has a rear translucent colorless or clear part 19 extending around the rear 14 and rear areas of the sides 16 and 17 and top 15 of said housing. The housing 12 also has an intermediate translucent part 20 colored red and extending around the sides 16 and 17 and the top 15 between the front part 18 and the rear part 19. The housing 12 is mounted on a rear fender with the front part 18 up and the rear part 19 down.

A plurality of lamps are provided in the housing, each in the area of a corresponding one of the front, intermediate and rear parts. Thus, as shown in FIG. 4, a lamp 21 is provided in the front part 18, a lamp 22 is provided in the intermediate part 20 and a lamp 23 is provided in the rear part 19.

While the invention has been described by means of specific examples and in specific embodiments, I do not wish to be limited thereto, for obvious modifications will occur to those skilled in the art without departing from the spirit and scope of the invention.

I claim

1. An outside light fixture for a motor vehicle having rear fenders, said light fixture comprising a housing having a front, rear, top, two sides, a front translucent part of a first color extending around the front and front areas of the sides and top of the housing, a rear translucent colorless part extending around the rear and rear areas of the sides and top of the housing and an intermediate translucent part of a second color different from the first extending around the sides and top between the front and rear parts, said housing being mounted on a rear fender with the front part up and the rear part down; and a plurality of lamps in the housing each in the area of a corresponding one of the front, intermediate and rear parts.

2. An outside light fixture as claimed in claim 1, wherein the front part is yellow and the intermediate part is red.

* * * * *